3,202,503
PRODUCTION OF HIGH QUALITY STEEL FROM IRON SAND
Tetsuo Shimamura and Kiyoshi Sasagawa, both of Tokyo, Japan, assignors to Yawata Iron & Steel Co., Ltd., and Tokoku Denka Kogyo Kabushiki Kaisha, Tokyo, Japan, both corporations of Japan
No Drawing. Filed May 1, 1961, Ser. No. 106,514
Claims priority, application Japan, July 5, 1960, 35/30,529
1 Claim. (Cl. 75—38)

The present invention relates to the production of a high quality steel from iron sand, and more particularly, to the process in which the iron sand concentrate in its original form of powder, sand or granule is charged into a reducing furnace and reduced under the controlled conditions of a temperature, usually below 1250° C., and a reducing period of time, wherein no sintering of sponge iron will be permitted to occur, whereby an aggregate of partially reduced sponge iron particles which cohere together with its original composition and structure in the form of granule or lump is produced, then formed into a pig iron in an electric iron furnace, then refined in a converter, an open-hearth furnace or an electric steel furnace to obtain a high quality steel.

Briefly stated, the invention contemplates the provision of a process which comprises subjecting the iron sand material to a reducing reaction to form a partially reduced sponge iron therefrom as a preliminary step, subsequently converting said sponge iron into a pig iron in an electric iron furnace as an iron making step, and finally converting said pig iron into a high quality steel in a converter, an open-hearth furnace or an electric steel furnace as a steel making step. That a reducing temperature for converting iron sand into a partially reduced sponge iron is preferred to be usually below the temperature of 1250° C. is because, if the reduction is effected above the temperature of 1250° C., a granulated product consisting of sintered or partially sintered sponge iron is formed, or a product covered with a sintered or partially sintered metallic iron layer is manufactured, and the resultant sponge iron product brings about not only a trouble in the operation of a rotary furnace, but also an inferior product in the iron making process.

The term, "partially reduced sponge iron" described in the disclosure, refers to the sponge iron obtained from the reduction of iron material at a temperature below the melting point thereof up to the form of a porous metallic iron and wüstite. The above sponge iron must retain the same structure or skeleton as the original raw iron ore, and the structure must be porous, although of a sand-like appearance.

Heretofore the sponge iron from iron sand produced generally by the Luppe process or other processes is obtained in the form of granule resulting from sintering or partial sintering of metallic iron or slag-forming components. In this event, the structure of a raw material differs from that of the resultant product, the surface of which being even and smooth and hardly porous. The granular sponge iron thus produced in accordance with the invention is particularly characterized by the above structure of the sand-like partially reduced sponge iron. The sponge iron particles are made to cohere one another with the above-mentioned structure to produce a cohered body of sponge iron particles as in the form of a porous coke.

In reference to two technical terms referred above, "cohension" and "sintering," the difference between them is evident: cohension is an aggregate of solid particles bonded together and molded into a shape at a temperature below the melting point thereof; sintering is a part or whole part of fused or partially fused sponge iron particles sintered or fused together and molded into a shape at a temperature above the melting point thereof.

In carrying out the reducing reaction in a reducing furnace in which iron sand concentrates together with reducing materials are placed, when we inquire into how the reducing reaction varies depending upon the temperatures of reducing zones, we find that the reduction will hardly proceed practically at a temperature of below 800° C. before equilibrium takes place, though the reduction occurs at the temperature of 570° C. in theory in case the charge has a temperature of below 800° C. in the reducing zone. At a temperature in the range of 800° to 1100° C. iron sand is subjected to reduction, but, as a matter of fact, it is really effective at a temperature in the range of 950° to 1100° C. to produce a partially reduced sponge iron in the form of sand granule, the structure of which is porous in spite of the granule which is as big as the original ore in size, and the rate of reduction of which has proceeded up to the extent of 15–45% metallic iron. At a temperature in the range of 1100° to 1250° C. the sintering of the partially reduced sponge iron does not take place, but an aggregate of porous sponge iron particles bonded or cohered together between them is produced. At a temperature of above 1250° C., a sponge iron resulting from the reduction at this temperature becomes a sintered one containing a sintered metallic iron derived from the sintering of either metallic iron or slag ingredients, the surface of which exhibits a smooth blobal one solidified from the sintered components, which will be disadvantageous for our process.

Thus, we have discovered that the temperature range of 1100°–1250° C. and a special condition of reduction can produce a special reducing environment to the iron ore, and it has been based on an entirely new and novel idea.

Accordingly, in carrying out reduction in accordance with the invention, it is most desirable to effect reduction at a temperature in the range of 1000°–1250° C. in order to produce a partially reduced granular sponge iron most economically on a commercial scale, whereby an easy operation of a rotary kiln and a high efficiency of iron manufacture are attained.

The partially reduced granular sponge iron thus produced is fundamentally different from the conventional sponge iron or "luppe" in respect of the structure and property and also in that the sponge iron of this invention is produced under the temperature range of 1000°–1250° C. in the form of an aggregated body of sponge iron particles cohered together, and it has a porous structure with a coarse surface thereon, the porosity is much larger than that of the original raw-iron sand, the oxygen atom contained in the structure of which being lost, while, on the other hand, the sponge iron of prior art is generally formed into a ball-like body with a smooth surface resulting from welding, sintering or semi-fusion of iron particles.

As described in the foregoing, the sponge iron particle produced by the invention is a porous substance with a coarse surface and its composition is almost uniform and homogeneous throughout its body, irrespective of its center as well as its surface, consisting of a partially reduced sponge iron of about 20–40% metallic iron and 0–5% $Fe_2O_3$. As a whole body of sponge iron particles, this body has a high porosity.

The sponge iron or "luppe" of prior art is generally made of a body of iron particles fused or sintered together partly or wholly with a smooth surface thereon, therefore it sometimes retains a raw iron sand in its center which has hardly been subjected to reduction to any extent. In addition, this particle has a smooth and dense surface together with a dense structure within, hence it has an exceedingly low porosity.

In order to bring about cohesion of partially reduced sponge iron particles, it is essential to maintain a controlled reducing temperature and, if desired, a controlled reducing period of time. Generally speaking, it is necessary to maintain the reducing temperature at a temperature about 100–200° C. higher than that of reducing a partially reduced sponge iron in the form of a sand particle. It is required to effect reduction under controlled conditions that a reducing period of time, a number of rotations of a rotary kiln, an inclination of the rotary kiln, and the length of a flame issuing from the burner are maintained in such manner that the cohesion of partially reduced sponge iron particles would take place.

It should be emphasized that the conventional rotary kiln process contemplates the provision of a granulated sponge iron resulting from sintering or semi-sintering of the sponge iron while, on the other hand, the present invention contemplates the provision of a granulated sponge iron by the application of a novel metallurgical process based on a novel metallurgical aspect that the cohesion of partially reduced sponge iron particles will be realized. Thus, a novel theoretical ground as well as a novel idea of the present invention lies in the above respect.

When the sponge iron obtained from sand iron is charged into an electric iron furnace for the production of pig iron, if it is a sponge iron particle of prior art, a satisfactory reduction is not effected, because it is of a smooth surface and of a very low porosity, which results in so low a rate of reduction by a reducing gas that the reducing action will hardly proceed into the center of the iron particle in spite of its surface full of metallic ingredients and there remains still an unreduced raw ore particle in its center. Thus, the reduction rate of conventional sponge iron is very low.

However, on the other hand, a body of sponge iron particles consisting of an aggregate cohered together of partially reduced sponge iron particles produced by the process of the invention is of a coarse surface as well as of a high porosity, and also of a uniform composition throughout the body of iron particles, hence highly reduced by the reducing action of a reducing gas or solid carbon.

Thus, when the partially reduced granular sponge iron is charged in an electric iron furnace, it is easily reduced and the electric power consumption per ton is considerably decreased compared to that of raw iron sand, which results in an improved efficiency of iron production. In addition, when this sponge iron is used, the aeration effect, the effect of the gas passing the preheating zone in the electric furnace is so improved that an easy operation of a closed electric furnace for collecting the electric furnace gas is achieved.

The above improved aeration will impart a charge material a most suitable property required for the closed electric furnace, the property of which has been considered to be one of the most difficult problems to be solved by industry, which results in an improved stability towards the operation of the electric furnace.

In addition, a cohered body of partially reduced sponge iron is produced by agglomerating particles of partially reduced sponge iron, so the control of distribution of particle size is so easy that a sponge iron of any desired particle size can be obtained in a continuous and uniform manner, which is of significance to industry.

The pig iron thus produced is a good pig iron containing a very small amount of copper, and a high quality steel containing very few impurities can be obtained from this iron by oxygen refining in a top blowing converter. It is to be understood that this steelmaking step can be carried out by the use of an open-hearth furnace or an electric furnace.

A preferred embodiment of the invention will be described hereinbelow:

*Example*

200 kg. iron sand concentrates of the following composition concentrated by the Crocket-type magnetic separator in the form of sand particles is charged into a closed rotary kiln (3.5 m. inside diameter, and 56 m. length) fired by heavy oil, in which the temperature of a reducing zone is maintained at a temperature of 1000–1250° C. and the iron sand is reduced with 180 kg. a granular coke per ton of the sponge iron product for a period of 24 hours to obtain 191 kg. of partially reduced sponge iron in the form of a granule having the following composition and the fineness of particle size. In spite of a continuous operation of the rotary kiln for an extended period of time, a detrimental ring-like accumulation of ore particles within the kiln, a cause of trouble for the continuous operation thereof, does not take place, and the sponge iron product of consistent uniform size is formed.

| Ingredient | Total Fe, percent | Metallic Fe, percent | FeO, percent | Fe$_2$O$_3$, percent | SiO$_2$, percent | TiO$_2$, percent |
|---|---|---|---|---|---|---|
| Before treatment | 57.15 | | 30.83 | 47.45 | 4.85 | 10.50 |
| After treatment | 65.02 | 28.30 | 41.50 | 4.46 | 6.00 | 13.50 |
| Particle size | −50 mesh | 50 mesh–3mm | 3–9mm | 9–15mm | 15mm above | |
| Distribution of particle size | 11.0 | 27.8 | 16.5 | 24.7 | 18.0 | |

Next, the above partially reduced granulated sponge iron is charged into an open-type arc furnace of 14,100 kva. and reduced with the result that the condition of the furnace is very quiet and a good pig iron is obtained with the following power consumption per ton. This is brought about by the improved aeration that a major proportion of oxygen retained in the raw ore has escaped off through the reduction, so an amount of gas evolving during the smelting operation of the electric furnace is inevitably decreased, though the partially reduced sponge iron in the form of a sand particle becomes as big as a raw ore particle.

Power consumption, kwh _____ 1770
Sponge pig iron, kg _____ 1600
Coke, kg _____ 208
Lime, kg _____ 250
Manganese, kg _____ 220
Electrode, kg _____ 7.7

*Composition of pig iron, percent*

Total C _____ 3.89
Si _____ 0.27
Mn _____ 0.83
P _____ 0.080
S _____ 0.036
Cu _____ 0.018

*Composition of slag, percent*

| | |
|---|---|
| $SiO_2$ | 25.90 |
| CaO | 25.22 |
| FeO | 2.18 |
| MnO | 2.09 |
| $Al_2O_3$ | 10.10 |
| MgO | 6.30 |
| $TiO_2$ | 26.30 |

The above pig iron is refined by the pure oxygen top blowing process in a top blowing converter to obtain a high quality steel containing a very low amount of copper and other following ingredients:

| | Percent |
|---|---|
| C | 0.15 |
| Si | 0.10 |
| Mn | 0.60 |
| P | 0.009 |
| S | 0.02 |
| Cu | 0.015 |

We claim:

In a process for making high quality steel from iron sands by making pig iron from said iron sands and refining the pig iron in an oxygen top blowing converter to produce high quality steel, the steps of (1) charging a rotary kiln with titanium containing iron sand and a reducing agent and heating the so-obtained mixture at a temperature of from 1,000 to 1,250° C. thereby producing partially reduced iron having a rough surface and porous structure and concomitantly reducing said iron sands until sponge iron containing 20 to 40% metallic iron and up to 5% $Fe_2O_3$ is produced and (2) charging an electric smelting furnace with said sponge iron together with additional reducing agent and flux, and refining said sponge iron to produce pig iron containing at least 3.89% carbon which is convertible to high quality steel.

References Cited by the Examiner

UNITED STATES PATENTS

| | | | |
|---|---|---|---|
| 2,653,088 | 9/53 | Pike | 75—39 |
| 2,741,555 | 4/56 | Cuscoleca et al. | 75—52 |
| 2,750,277 | 6/56 | Marshall | 75—38 |
| 2,806,779 | 9/57 | Case | 75—33 |
| 2,919,983 | 1/60 | Halley | 75—38 |
| 3,028,231 | 4/62 | Klemantaski et al. | 75—38 |
| 3,029,141 | 4/62 | Sibakin et al. | 75—33 |
| 3,032,410 | 5/62 | O'Day | 75—38 |

BENJAMIN HENKIN, *Primary Examiner.*

RAY K. WINDHAM, *Examiner.*

UNITED STATES PATENT OFFICE
CERTIFICATE OF CORRECTION

Patent No. 3,202,503                        August 24, 1965

Tetsuo Shimamura et al.

It is hereby certified that error appears in the above numbered patent requiring correction and that the said Letters Patent should read as corrected below.

In the grant, lines 3, 13 and 14, and in the heading to the printed specification, line 6, for "Tokoku Denka Kogyo Kabushiki Kaisha,", each occurrence, read -- Tohoku Denka Kogyo Kabushiki Kaisha, --.

Signed and sealed this 3rd day of May 1966.

(SEAL)
Attest:

ERNEST W. SWIDER                        EDWARD J. BRENNER
Attesting Officer                        Commissioner of Patents